(12) United States Patent
Marin et al.

(10) Patent No.: US 12,049,598 B2
(45) Date of Patent: Jul. 30, 2024

(54) MIXTURE OF STEAM-CRACKED BIOMASS AND LIGNIN FOR GRANULE PRODUCTION

(71) Applicant: EUROPEENNE DE BIOMASSE, Paris (FR)

(72) Inventors: Jean-Baptiste Marin, Paris (FR); Thomas Habas, Paris (FR); Adriana Quintero-Marquez, Le Vesinet (FR); Frédéric Martel, Riems (FR)

(73) Assignee: EUROPEENNE DE BIOMASSE, Paris (FR)

( * ) Notice: Subject to any disclaimer, the term of this patent is extended or adjusted under 35 U.S.C. 154(b) by 164 days.

(21) Appl. No.: 17/594,947

(22) PCT Filed: Apr. 30, 2020

(86) PCT No.: PCT/FR2020/050731
§ 371 (c)(1),
(2) Date: Nov. 3, 2021

(87) PCT Pub. No.: WO2020/225506
PCT Pub. Date: Nov. 12, 2020

(65) Prior Publication Data
US 2022/0306959 A1    Sep. 29, 2022

(30) Foreign Application Priority Data

May 3, 2019   (FR) ..................................... 1904684

(51) Int. Cl.
*C10L 9/08*        (2006.01)
*C07G 1/00*        (2011.01)
(Continued)

(52) U.S. Cl.
CPC ................ *C10L 9/083* (2013.01); *C07G 1/00* (2013.01); *C08H 6/00* (2013.01); *C08L 97/02* (2013.01);
(Continued)

(58) Field of Classification Search
CPC .. C07G 1/00; C08H 6/00; C08L 97/02; C10L 5/143; C10L 5/363; C10L 5/44;
(Continued)

(56) References Cited

U.S. PATENT DOCUMENTS 8,852,301 B1 * 10/2014 Bootsma .................. C08H 6/00
44/577
2011/0302832 A1   12/2011 Grønn
(Continued)

FOREIGN PATENT DOCUMENTS

CN        1575221 A      2/2005
CN      101010417 A      8/2007
(Continued)

OTHER PUBLICATIONS

International Search Report for International Application No. PCT/FR2020/050731 dated Sep. 15, 2020, 2 pages.
(Continued)

*Primary Examiner* — James C Goloboy
(74) *Attorney, Agent, or Firm* — TraskBritt

(57) ABSTRACT

A biomass upgrading process comprises a steam-cracking step for producing a granulated combustible product, and, prior to the granulation step, a step of mixing an intermediate pulverulent product resulting from the steam-cracking of the biomass and a pulverulent material having a high lignin content.

4 Claims, 1 Drawing Sheet

(51) Int. Cl.
*C08H 7/00* (2011.01)
*C08L 97/02* (2006.01)
*C10L 5/14* (2006.01)
*C10L 5/36* (2006.01)
*C10L 5/44* (2006.01)

(52) U.S. Cl.
CPC ............... *C10L 5/143* (2013.01); *C10L 5/363* (2013.01); *C10L 5/44* (2013.01); *C10L 2200/0469* (2013.01); *C10L 2290/02* (2013.01); *C10L 2290/24* (2013.01)

(58) Field of Classification Search
CPC ............. C10L 9/083; C10L 2200/0469; C10L 2290/02; C10L 2290/24
See application file for complete search history.

(56) References Cited

U.S. PATENT DOCUMENTS

| | | | |
|---|---|---|---|
| 2015/0361367 A1* | 12/2015 | Tait | C10L 5/445 44/589 |
| 2018/0334629 A1 | 11/2018 | Scalzo et al. | |
| 2018/0334630 A1* | 11/2018 | Scalzo | C10L 5/363 |

FOREIGN PATENT DOCUMENTS

| | | | | |
|---|---|---|---|---|
| CN | 101824347 A | 9/2010 | | |
| EP | 2373767 B1 | 7/2018 | | |
| JP | 2015-091996 A | 5/2015 | | |
| WO | 2010/071440 A1 | 6/2010 | | |
| WO | WO-2014210252 A1 * | 12/2014 | ............. | C10L 5/143 |
| WO | 2019/054913 A1 | 3/2019 | | |
| WO | WO-2019054913 A1 * | 3/2019 | ............. | C10L 5/143 |

OTHER PUBLICATIONS

International Written Opinion for International Application No. PCT/FR2020/050731 dated Sep. 15, 2020, 6 pages.

Chinese Search Report for Application No. 202080048062 dated Jun. 25, 2023, 3 pages.

Indian Office Action for Application No. 202117056015 dated Oct. 12, 2023, 6 pages.

Japanese Notification of Reasons for Refusal for Application No. 2022512482, 3 pages.

* cited by examiner

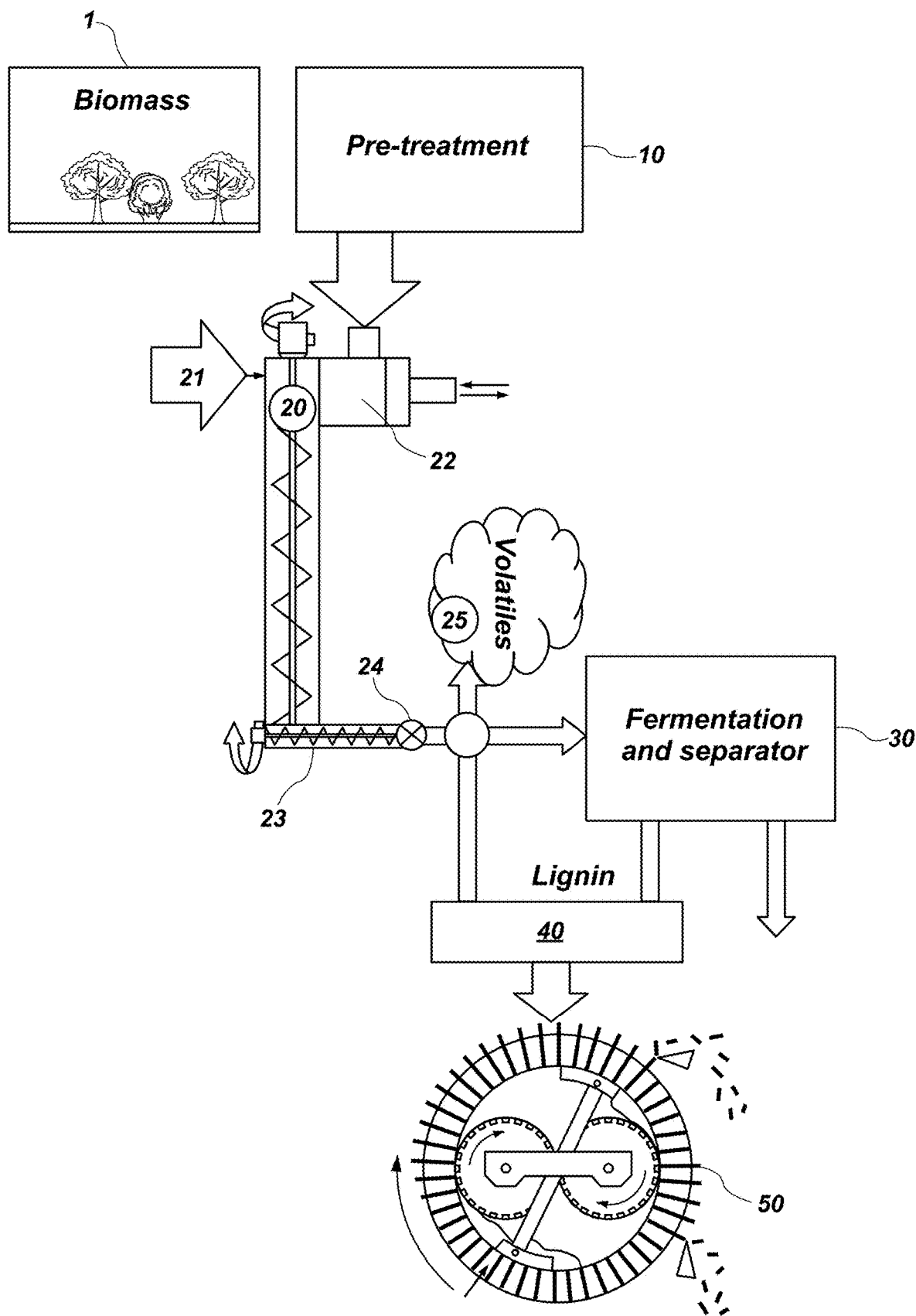

MIXTURE OF STEAM-CRACKED BIOMASS AND LIGNIN FOR GRANULE PRODUCTION

CROSS-REFERENCE TO RELATED APPLICATIONS

This application is a national phase entry under 35 U.S.C. § 371 of International Patent Application PCT/FR2020/050731, filed Apr. 30, 2020, designating the United States of America and published as International Patent Publication WO 2020/225506 A1 on Nov. 12, 2020, which claims the benefit under Article 8 of the Patent Cooperation Treaty to French Patent Application Serial No. 1904684, filed May 3, 2019.

TECHNICAL FIELD

The present disclosure relates to the field of exploitation of lignocellulosic biomass, in particular for the production of fuel of the "black pellets" type having a high calorific value.

BACKGROUND

The transformation of lignocellulosic biomass wood, agricultural waste, co-products of agriculture and the agro-industry) into an energy-dense, transportable, and easily storable compound, would make it possible to develop and consolidate a stationary energy industrial sector (biofuel used at a fixed point, at home, in contrast with biofuel oils and to reduce the environmental impacts ($CO_2$ fossil emission, with a biomass without fertilizers or phytosanitaries).

Black pellets are cylinders that are resistant to degradation by humidity, are 1 to 3 cm long, and have a good mechanical resistance, allowing for storage and handling that is similar to that of carbon. The combustion thereof generates little in the way of ash, having a lower calorific value (LCV) of close to from 18 to 20 joules/gram of thy material.

The black pellets are produced from lignocellulosic biomass that undergoes heat treatment, followed by sharp depressurization, which makes it possible to provide a material that is waterproof when shaped for production of pellets or compacts. Indeed, the first material is exposed to steam, which releases finer particles, allowing the material to exhibit significant cohesion during the phase of aggregation or molding.

The European patent EP2373767B1 is known from the prior art, which describes a discontinuous method for producing black pellets from a lignin-containing material.

This method comprises the following steps:
(a) passing the lignin-containing material, having a relative humidity content of from 0 to 20 wt. %, into a reactor;
(b) heating the lignin-containing material to 180° C. to 235° C. by injecting steam into the reactor;
(c) keeping the material in the reactor at the temperature reached between 1 to 12 minutes, in order to soften the material and release lignin;
(d) reducing the pressure in the reactor in at least one step; and
(e) shaping the treated material in order to form tablets or compacts.

The lignin-containing material is a lignocellulosic material, a material comprising wood, bamboo, bagasse, straw, or grass, in the form of shavings of 25 mm in length. The final pressure reduction for the reactor takes place suddenly, by means of steam explosion, such that the material is defibered.

The international patent WO2019/054913A1 discloses a method for producing pulp, which allows for the production of fuel tablets or compacts from wood. The method comprises continuous heat treatment of the bark at a high pressure and temperature, using steam, prior to pelletizing. The heat treatment can be carried out at a pressure of from 5 to 30 bar, or preferably from 15 to 25 bar, and can be carried out at a temperature of 150° C. to 240° C., It can be carried out over less than 25 minutes, or, more preferably, less than 15 minutes.

United States Patent Application Publication US 2015/361367A1 also describes a method for producing pellets from biomass, formed both of non-transformed biomass originating from an enrichment sub-system comprising a steam-cracking step, and transformed biomass originating from a pelletizing sub-system.

Finally, the American patent US2018/334630A1 relates to a method for producing engineered soil from raw biomass. The method comprises a step of enriching the material using steam, and then a step of steam-cracking.

The solutions of the prior art for producing black pellets are promising. However, they have limits, in particular the amount of energy provided per volume of pellet, which, although greater than that of biomass in bar form or in white pellet form, is still 30 to 40% less than that of carbon, for the same volume or weight.

Moreover, the lignin enrichment is known from the prior art through mixing biomass originating from the step of different methods, or even lignin not originating from the processed biomass after the steam-cracking step.

BRIEF SUMMARY

In order to overcome these disadvantages, the present disclosure relates, according to the most general sense thereof, to a method for biomass exploitation comprising a step of steam-cracking in order to produce a pelleted fuel product, wherein the method comprises a step of mixing the intermediate pulverulent product originating from the steam-cracking of the biomass, and a pulverulent material having a high lignin content, prior to the pelletizing step.

The biomass exploitation method advantageously comprises a step of steam-cracking in order to produce an intermediate pulverulent product, wherein the method comprises:
a first chemical or biochemical treatment of the intermediate product originating from the steam-cracking, in order to produce on the one hand a chemical or biochemical compound, and on the other hand lignin;
a second treatment by means of mixing the intermediate product and lignin obtained at least in part by the first treatment; and
a pelletizing step for pelletizing the mixture at the end of the second treatment.

The disclosure thus relates to a method for biomass exploitation comprising a step of steam-cracking in order to produce a pelleted fuel product, comprising a step of mixing the intermediate pulverulent product originating from the steam-cracking of the biomass, and a pulverulent material having a high lignin content, prior to the pelletizing step, and wherein the method comprises a step of steam-cracking in order to produce an intermediate pulverulent product, and in that it comprises:

a step of steam-cracking in order to produce a steam-cracked biomass, at least 50 wt. % of which is mixed with the ligneous fraction obtained by chemical or biochemical treatment of the residual portion of the steam-cracked biomass; and a pelletizing step for pelletizing the mixture.

A preferred embodiment of the present disclosure involves using a lignin that originates from steam-cracking prior to the first treatment.

This solution involves making use of a co-product that is naturally present in the biomass, i.e., lignin, which represents 20% to 30% of the mass thereof, having a unitary calorific value that is more than 50% higher than the initial biomass, and a plurality of hydrophobicity and cohesion properties, in order to enrich the black pellets without adding additional energetic constituents to the biomass.

Within the meaning of the present disclosure, "material having a high lignin content" means a material containing at least 50% lignin.

The method advantageously comprises a step of mixing steam-cracked lignin material and material having a high lignin content originating from a second treatment, prior to the pelletizing step.

According to an embodiment, the material having a high lignin content is a solid co-product having a content greater than the level of lignin contained in the biomass. A material of this kind may, for example, have a calorific value that is at least 10% greater than the calorific value of the initial biomass.

According to a particular embodiment, the high content material is a lignin co-product of the treatment of black liquor in the paper-making industries.

Preferably, 2 to 30% of the material having a high lignin content is mixed with an additional quantity of steam-cracked biomass.

Thus, the pelleted fuel product according to the disclosure has a calorific value that is increased on account of the enrichment with lignin, the cohesion between the two types of pulverulent products being achieved by virtue of the steam-cracking, which modifies the structure of the lignin.

The disclosure also relates to an installation for biomass exploitation formed by a steam cracker, a pelletizing station, and a transformation station for transforming some of the steam-cracked products in order to produce lignin, wherein it comprises feed means for feeding some of the steam-cracked products and at least some of the lignin, produced by the transformation station, to the pelletizing station.

BRIEF DESCRIPTION OF THE DRAWING

The present disclosure will be more clearly understood upon reading the following detailed description of a non-limiting embodiment of the disclosure, with reference to the accompanying drawings, in which:

FIG. 1 is a schematic view of the disclosure.

DETAILED DESCRIPTION

FIG. 1 is a flow diagram of an installation for implementing the disclosure.

As shown therein, a method for producing tablets or compacts (also referred to as "black pellets") from biomass containing lignin, comprises steps including:

(a) pre-treating the biomass (1) in equipment (10) for carrying out a reduction of particles of several cubic centimeters, and optionally carrying out partial drying, in order to achieve the form of dust, sawdust, shavings, fragments, cellulose shavings, flakes, trimmings, or scraps; and (b) passing the biomass, thus pre-treated, into a reactor (20) in order to heat the particles of biomass to a temperature of from 180° C. to 235° C. by injecting steam (21) into the reactor (20). A first feed chamber (22) carries the biomass toward a reactor (20), which contains an endless screw or allows for passage under the influence of gravity, and carries the hydrolyzed material into the reactor at the temperature reached between 1 to 12 minutes, in order to soften the material and release lignin, as far as an outlet zone (23) provided with a valve (24), allowing for the extraction of the steam-cracked biomass after passing into a lower-pressure zone.

Optionally, some of the waste gases (25) are recovered for additional exploitation.

At the output of the reactor (20) a separation is carried out, some of the steam-cracked biomass being introduced into a second reactor (30) ensuring treatment in order to extract compounds having added value, for example, polymeric sugars (cellulose and hemicellulose) or sugars such as glucose or xylose, and furthermore a lignin-rich co-product.

The lignin-rich co-product is mixed with the steam-cracked biomass in a mixer (40), and then compressed in a pelletizing press (50) in order to form lignin-rich fuel pellets.

The effect of the steam-cracking treatment is that of destructuring the biomass fiber matrix, which allows for easier release of fermentable monosaccharides.

It results in the separation of the hemicellulosic fraction, which makes it possible to increase the accessibility of the cellulosic fraction by creating large pores within the fibrous structure, resulting in hydrolysis reactions. It also promotes the reduction in the crystallinity of the cellulose. Various studies show that the thermochemical treatments tend to increase the crystallinity index of the cellulosic fraction, resulting in a reduction in the accessibility of the substrate.

Finally, the access to the cellulose fibers is greatly restricted by the presence of lignin, which is a matrix that surrounds the cellulosic fraction. Elimination of the lignin is essential in order to carry out hydrolysis operations.

The installation also provides the possibility of introducing lignin, originating from a remote production site, into the mixer (40) in order to enrich the steam-cracked material with lignin.

The aim is to produce pelleted fuels having a calorific value at least equal to 5300 kWh/ton, for an initial biomass of 5000 kWh/ton.

The steam-cracking increases the calorific value by extracting the low-energy volatile oxygenated molecules from the solid residue, which arithmetically increases the calorific value thereof, to reach 5200 to 5400 kWh/ton under acceptable economic conditions. The addition of lignin originating from the co-product of a second reaction and having a calorific value of 7500 kWh/ton, at a level of approximately 2 wt. % to 30 wt. %, makes it possible to increase the qualities of the pellets.

Addition of Lignin Co-Product of Black Liquor

According to an advantageous variant, the lignin mixed into the steam-cracked biomass is recovered from co-products of the treatment of black liquor produced in the paper-making industry, in order to form a liquid lignin phase.

Three methods for recovering lignin from black liquor used in the production of paper are conventionally used. The first method, implemented in the 1940s close to a host kraft plant located in Charleston (South Carolina), makes it possible to produce powdered lignin, having the disadvantage of a high salt content. The salt creates problems of a high concentration of cinders in the kilns. Moreover, the high contents of cinders may negatively affect the properties of green chemistry applications containing lignin. Nonetheless, a mixture of 2 to 5% of this lignin with the result of the steam-cracking makes it possible to enrich the calorific value without significant disadvantages.

The second method, developed since the 1990s, is used in a host pulp mill in Plymouth (North Carolina). This second method produces lignin having a low salt content, which can be used as a fuel. A third method, developed over the past ten years, begins with the production installation in a paper pulp mill in Hinton, Alberta.

The three technologies use sulfuric acid as a strong acid, which produces significant levels of sodium sulfate in the form of a brine flow. In order to recover the sodium, the sodium sulfate must be incorporated into the paper-making recovery system, by adding sulfur to the charge. A lignin extraction process is necessary in order not to add sulfur to the paper-making.

Eliminating a fraction (up to 30%) of the lignin from the black liquors allows the pulp and paper mills, which have reached the maximum output in their recovery boilers, to increase their production of the same lignin fraction that is withdrawn and injected into the mixer (40) in order to improve the calorific qualities of the steam-cracked biomass.

The invention claimed is:

1. A method of producing a pelleted fuel product, comprising:
    steam-cracking biomass to produce an intermediate pulverulent product;
    dividing the intermediate pulverulent product into a first portion of the intermediate pulverulent product and a second portion of the intermediate pulverulent product;
    wherein the first portion and second portion are identical in composition
    chemically or biochemically treating the first portion of the intermediate pulverulent product to produce a material, the material having a lignin content of at least 50% by weight of lignin, the lignin content in the material being greater than a lignin content in the biomass;
    mixing the second portion of the intermediate pulverulent product with the material to produce a mixture; and
    pelletizing the mixture to generate the pelleted fuel product.

2. A method of claim 1, wherein the pelleted fuel product has a unitary calorific value at least 10% greater than the calorific value of the biomass.

3. The method of claim 2, wherein mixing the second portion of the intermediate pulverulent product with the material to produce a mixture comprises producing a mixture comprising from about 2% to about 30% by weight of the material based on total weight of the mixture.

4. The method of claim 1, wherein mixing the second portion of the intermediate pulverulent product with the material to produce a mixture comprises producing a mixture comprising from about 2% to about 30% by weight of the material based on total weight of the mixture.

* * * * *

UNITED STATES PATENT AND TRADEMARK OFFICE
CERTIFICATE OF CORRECTION

PATENT NO. : 12,049,598 B2
APPLICATION NO. : 17/594947
DATED : July 30, 2024
INVENTOR(S) : Jean-Baptiste Marin et al.

It is certified that error appears in the above-identified patent and that said Letters Patent is hereby corrected as shown below:

In the Specification

| | | | |
|---|---|---|---|
| | Column 1, | Line 26, | change "biomass wood," to --biomass (wood,-- |
| | Column 1, | Line 31, | change "biofuel oils" to --biofuel oils),-- |
| | Column 1, | Line 40, | change "of thy material." to --of dry material.-- |
| | Column 2, | Line 11, | change "to 240° C., It" to --to 240° C. It-- |

In the Claims

| | | | |
|---|---|---|---|
| Claims Heading, | Column 6, | Line 1, | change "The invention claimed is:" to --What is claimed is:"-- |
| Claim 1, | Column 6, | Line 8, | change "pulverulent product;" to --pulverulent product,-- |
| Claim 1, | Column 6, | Line 10, | change "in composition" to --in composition;-- |

Signed and Sealed this
Seventeenth Day of September, 2024

Katherine Kelly Vidal
*Director of the United States Patent and Trademark Office*